United States Patent
Yamanaka

(10) Patent No.: US 7,068,588 B2
(45) Date of Patent: Jun. 27, 2006

(54) OPTICAL DISK MEDIUM HAVING A PREDETERMINED CHANGE IN THE TILT OF THE SURFACE

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 392 days.

(21) Appl. No.: 10/429,694

(22) Filed: May 6, 2003

(65) Prior Publication Data

US 2003/0210620 A1 Nov. 13, 2003

(30) Foreign Application Priority Data

May 13, 2002 (JP) .............................. 2002-136896
Feb. 21, 2003 (JP) .............................. 2003-043679

(51) Int. Cl.
*G11B 7/95* (2006.01)
(52) U.S. Cl. .............................. 369/275.4; 369/53.19; 369/44.32; 369/283
(58) Field of Classification Search ............. 369/44.32; G11B 7/00
See application file for complete search history.

(56) References Cited

U.S. PATENT DOCUMENTS

| | | | | |
|---|---|---|---|---|
| 5,322,993 | A | * | 6/1994 | Ohyama ..................... 369/118 |
| 6,023,451 | A | * | 2/2000 | Kashiwagi et al. ...... 369/275.5 |
| 6,087,067 | A | | 7/2000 | Kato et al. |
| 6,175,548 | B1 | | 1/2001 | Kashiwagi |
| 2001/0036596 | A1 | | 11/2001 | Mizushima et al. |
| 2001/0043523 | A1 | | 11/2001 | Hayashi et al. |

FOREIGN PATENT DOCUMENTS

| | | |
|---|---|---|
| EP | 0 329 234 A | 8/1989 |
| EP | 0 987 689 A | 3/2000 |
| EP | 0 994 470 A | 4/2000 |
| EP | 1 154 420 A | 11/2001 |
| EP | 1 170 734 A | 1/2002 |
| JP | 8-321079 | 12/1996 |
| JP | 10-289479 | 10/1998 |
| JP | 2002-92958 | 3/2002 |

OTHER PUBLICATIONS

K. Schep et al., "Format Description and Evaluation of the 22.5 GB DVR Disc", International Symposium on Optical Memory 2000, Technical Digest, The Japan Society of Applied Physics, Sep., 2000, pp. 210-211.

* cited by examiner

*Primary Examiner*—William Korzuch
*Assistant Examiner*—Joseph Haley
(74) *Attorney, Agent, or Firm*—Foley & Lardner LLP

(57) ABSTRACT

An optical disk medium and a drive system are provided that enable high density recording to be carried out. In the optical disk medium, recorded information tracks are formed in a concentric or spiral manner, and information is recorded and played back by irradiating the recorded information tracks with a laser beam through a transparent substrate or a transparent cover layer. A change in tilt of the optical disk medium over one circuit of each of the tracks is set equal to or less than an allowed value, a change in tilt over the entire surface of the optical disk medium is permitted to be larger than the allowed value, and low frequency bandwidth tilt control is carried out by the drive system.

28 Claims, 10 Drawing Sheets

IMPULSE RESPONSE

PR(1,2,2,1) EQUALIZED EYE PATTERN

PR(1,2,2,2,1) EQUALIZED EYE PATTERN

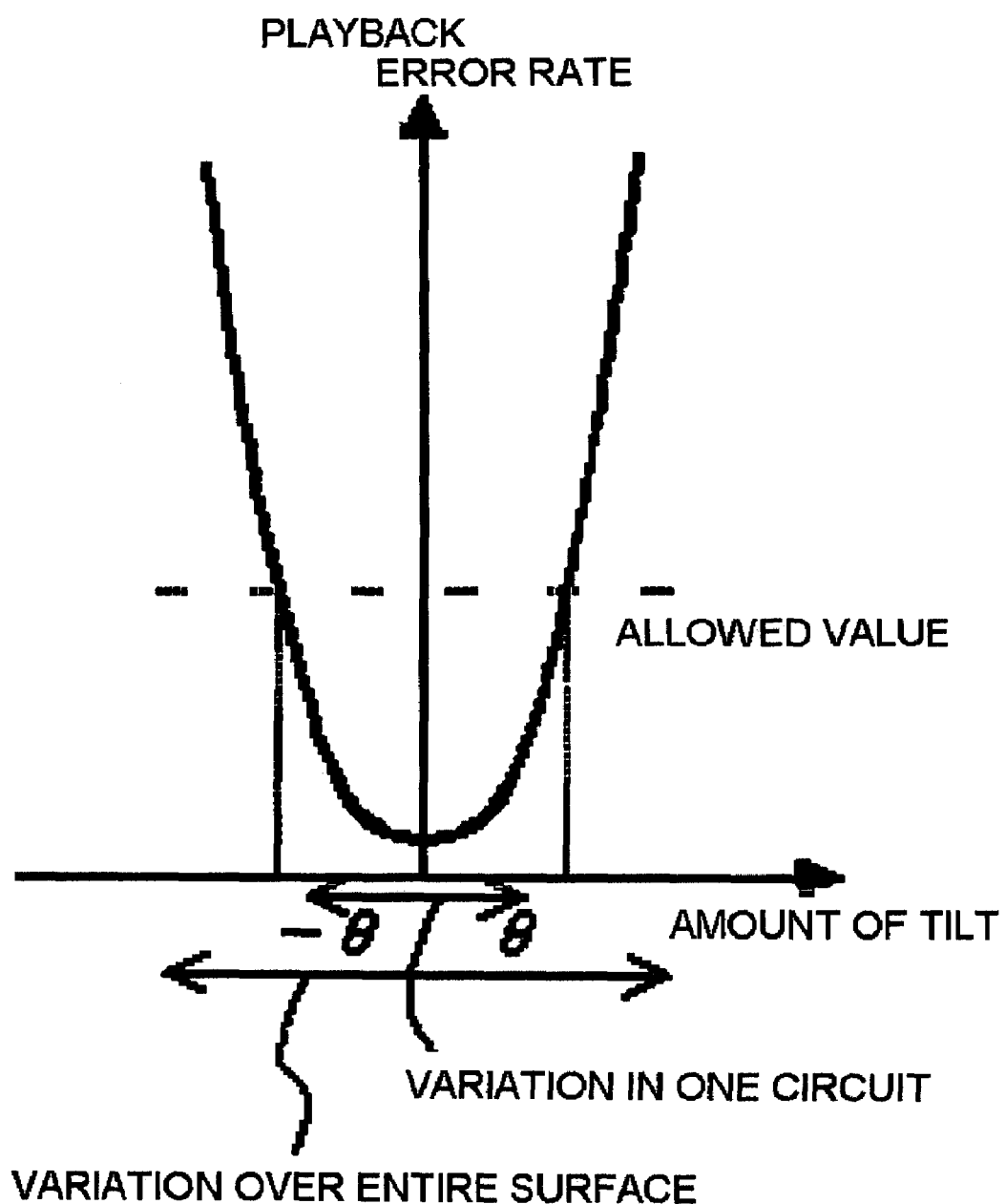

PARABOLIC SHAPE
DEFORMATION

POTATO CHIP SHAPE
DEFORMATION

OPTICAL DISK MEDIUM HAVING A PREDETERMINED CHANGE IN THE TILT OF THE SURFACE

This application is based on Japanese patent applications NO.2002-136896 and NO.2003-43679, the contents of which are incorporated hereinto by reference.

BACKGROUD OF THE INVENTION

1. Field of the Invention

The present invention relates to an optical disk medium and a drive system in which recording or playback is carried out by a laser beam focused to a very small spot by a lens.

2. Description of the Related Art

Although the use of optical disks such as CD (Compact Disk) and DVD (Digital Versatile Disk) is widespread, there is still a desire for realization of a higher recording density for the purpose of recording Hi-Vision video, etc. In a current recording and playback arrangement in which a very small laser beam spot is formed on an optical disk medium using an objective lens, the diameter of the beam spot that is formed controls the recording density and, in particular, the linear recording density in the track direction. Because of this, the wavelength of a laser light source and the numerical aperture of an objective lens, which define the beam spot diameter, are always specified in the standard specification of optical disk media.

The beam spot diameter is proportional to $$\lambda/NA \qquad (1)$$

where $\lambda$ [μm] denotes the wavelength of the laser light source and NA denotes the numerical aperture of the objective lens. The amplitude of a signal played back using this beam spot diameter varies depending on the periodicity of pits recorded on the optical disk. FIG. 1 shows the relationship between the pit periodicity and the playback signal amplitude. As the pit periodicity decreases toward $\lambda/(2 \cdot NA)$, which is the optical cutoff wavelength of the objective lens, the playback signal amplitude decreases steadily. Since the minimum pit length or space length at which a signal can be played back can be expected to be half the optical cutoff wavelength, it can be expressed as follows.

$$0.25 \cdot \lambda/NA \qquad (2)$$

When the wavelength $\lambda$ is 0.65 μm and the lens numerical aperture NA is 0.6, as in the specified DVD conditions, the pit length at cutoff is about 0.27 μm from expression (2).

The pit length employed in a conventional optical disk is sufficiently longer than the optical cutoff pit length, and in the case of DVD, the minimum pit length Lp is 0.4 μm, and the relationship between the minimum pit length Lp, the wavelength $\lambda$, and the lens numerical aperture NA can be expressed as follows.

$$Lp = 0.37 \cdot \lambda/NA \qquad (3)$$

In an optical disk system for recording or playing back digital data using an optical disk, in general, a sequence of original digital data signals are not recorded as they are, but are encoded in one form or another. Furthermore, since it is necessary to simultaneously detect a clock signal from the playback signal sequence, low frequency components contained in the playback signal are suppressed by restricting the continuation of zeros and ones so as to limit the playback signal bandwidth, thereby improving the S/N ratio.

In practice, the encoding is carried out using 8/16 modulation coding, which is in the DVD specification, or 1–7 coding. In the 8/16 modulation coding, original 8-bit data are converted into 16-bit encoded data, in which the minimum encoded data bit length is limited to 3 bits. In the 1–7 coding, original 2-bit data are converted into 3-bit encoded data, in which the minimum encoded data bit length is limited to 2 bits. This minimum encoded data bit length corresponds to the minimum pit length Lp.

In the 8/16 modulation coding, the minimum encoded data bit length for original 1-bit data is 1.5, and in the 1–7 coding, it is 1.33. Since the minimum encoded data bit length, that is, the minimum pit length Lp of the 8/16 modulation coding is longer, at first sight it might seem that encoding using the 8/16 modulation coding would be more suitable for realizing a higher density. However, since the clock length of the encoded data in the 8/16 modulation coding is 0.5 relative to original 1-bit data, which is shorter than the 0.67 of the 1–7 coding, identification errors occur easily. As a result, in actual optical disk systems, it has been confirmed that the 1–7 coding is more suitable for realizing a high density, and in a recent proposal relating to high density optical disk media an encoding method closer to the 1–7 coding is employed. In order to realize a higher density the minimum pit length Lp is therefore even closer to the optical cutoff pit length.

In order to increase the density of an optical disk medium, in general, shortening the wavelength $\lambda$ of the laser beam light source and increasing the lens numerical aperture NA of the objective lens are very effective, and there is proposed (see, for example, reference 1) an optical disk specification of about 23 GB for the same disk size as that of DVD using a blue laser as the light source (hereinafter, also called simply 'specification 1').

Reference 1: Kees Schep, and 7 others, 'Format Description and evaluation of the 22.5 GB DVR Disc', International Symposium on Optical Memory 2000, Technical Digest, The Japan Society of Applied Physics, September, 2000, p. 210–211.

In specification 1, since the wavelength $\lambda$ is 0.405 μm, the lens numerical aperture NA is 0.85, and the minimum pit length Lp is 0.16 μm, the minimum pit length Lp can be expressed as follows.

$$Lp = 0.336 \cdot \lambda/NA \qquad (4)$$

Although the minimum pit length Lp defines the density in the track direction, since the track pitch can also be reduced by reducing the beam spot diameter as for the linear recording density, it can be expected that the recording capacity will increase approximately as the second power of the beam spot diameter.

However, the problem arising here is a decrease in the tilt margin between the optical axis of the lens and the perpendicular axis of the optical disk. In the case of an optical disk medium, in order to protect the recording surface, which has information tracks recorded thereon, the laser beam is focused onto the recording surface through a transparent substrate or a transparent cover layer (hereinafter, the 'transparent substrate' and the 'transparent cover layer' are also called generically 'transparent substrate'). When the perpendicular axis of the optical disk is tilted relative to the lens optical axis, this transparent substrate generates aberration, thus increasing the beam spot diameter on the optical disk medium and degrading the playback signal characteristics.

It is known that, in the region where the tilt is small, coma aberration is dominant, and the degree of coma aberration is proportional to the following expression, $$d/2 \cdot (n^2-1) \cdot n^2 \cdot \sin\phi \cdot \cos\phi/(n^2-\sin^2\phi)^{5/2} \cdot NA^3/\lambda \quad (5)$$

where d [μm] denotes the thickness of the transparent substrate, n denotes the refractive index, and 100 denotes the amount of tilt. A root-mean-square deviation (hereinafter also called an 'rms value') of wavefront aberration within the lens aperture is obtained by multiplying the above expression by an appropriate constant. The 'coma aberration' is hereinafter evaluated by means of the 'wavefront aberration'.

When there is a small amount of tilt φ of 1 deg or less, the amount of wavefront aberration generated can be obtained from the following expression by trigonometric approximation.

$$(n^2-1)/(2n^3) \cdot d \cdot NA^3/\lambda \cdot \phi \quad (6)$$

It is clear from this expression that the amount of wavefront aberration generated is proportional to the amount of tilt φ. FIG. 2 shows the rms value of the amount of wavefront aberration generated within the lens aperture, obtained by ray tracing. It can be seen from this figure that there is a proportional relationship between the rms value of the amount of wavefront aberration and the amount of tilt φ, and it confirms that there is a correlation between expression (6), which is obtained by an approximate analysis, and the rms value of the amount of wavefront aberration.

The result shown by the broken line in this figure shows a characteristic of the current DVD standard conditions and, for example, the amount of tilt in a direction orthogonal to the tracks in the DVD-ROM standard is specified to be 0.4 deg or less, which indicates that an rms value of 0.04 rmsλ or less for the amount of wavefront aberration is employed as a practically allowed value.

From expression (6), it can be seen that if the wavelength λ is changed from 0.65 to 0.405 μm and the lens numerical aperture NA is changed from 0.6 to 0.85, then the amount of tilt φ that gives the same amount of wavefront aberration decreases by about 0.22 times. This indicates that the tilt margin during recording and playback decreases accordingly.

It is also clear from expression (6) that the amount of wavefront aberration is proportional to the thickness d of the transparent substrate. The proposal for realizing a higher density of the optical disk medium in specification 1 ensures that the tilt margin is substantially the same level as that of the DVD standard by decreasing the thickness d of the transparent substrate to 100 μm from the 600 μm of the DVD standard, in order to compensate for the decrease in the margin.

FIG. 3 shows the relationship between the amount of tilt and an error rate. When the playback signal error rate is plotted on the ordinate and the amount of tilt is plotted on the abscissa, as shown in the figure the error rate describes a curve having an optimal tilt angle at its center. The tilt causes aberration in a laser beam passing through the transparent substrate, thus enlarging the beam spot diameter or changing the shape of the beam spot. Because of this, read errors occur due to a decrease in the playback signal amplitude and waveform deformation, thus increasing the error rate. In general, the increase in the occurrence of errors accelerates when the amount of aberration exceeds a certain level, and as a result the characteristic curve shown in the figure is obtained.

In an actual system, the tilt margin is specified with an allowable predetermined error rate such as, for example, $1\times 10^{-4}$, so as to have a width shown by the arrow.

When the thickness d decreases, the curvature flattens as shown by the broken line, and the tilt margin increases. In the specification for an optical disk of about 23 GB using a blue laser as a light source proposed in specification 1, the thickness d of the transparent substrate is 100 μm, which is thin, and it is confirmed in improved characteristics that the maximum value allowed for the amount of tilt is on the order of 0.7 deg, that is, the allowed width for the amount of tilt is on the order of ±0.7 deg. This is substantially the same as an allowed width for the amount of tilt of ±0.6 deg, which is obtained from the error rate characteristics of the DVD standard. In the DVD standard, the allowed width for the amount of tilt is specified to be ±0.4 deg, which is a value having some leeway, based on actual measurement while taking into consideration the simultaneous occurrence of other factors that increase the error rate such as defocusing, and in the present specification 1 the standard value can be set at roughly the same level.

If it is estimated that the overlap with other factors that increase the error rate is small, it is assumed that the practically allowable limits under DVD conditions are 0.5 deg for the amount of tilt and about 0.05 rmsλ or less for the rms value of the wavefront aberration. Applying these values to expression (6), the limiting condition can be expressed as follows using a given value K.

$$K=(n^2-1)/(2n^3) \cdot d \cdot NA^3/\lambda \cdot (0.5) \quad (7)$$

With the DVD standard conditions where n=1.58, NA=0.6, λ=0.65 μm, and d=600 μm, K is 19. Using this value for K, the allowed conditions for the amount of tilt θ of the optical disk can also be expressed as follows.

$$19 \geq (n^2-1)/(2n^3) \cdot d \cdot NA^3/\lambda \cdot \theta \quad (8)$$

$$\theta \leq 38 \cdot \lambda/(NA^3 \cdot d) \cdot n^3/(n^2-1) \text{ [deg]} \quad (9)$$

Since substantially the same value for K is obtained when NA=0.85, λ=0.405 μm, d=100 μm, and φ=0.6 deg, it can be seen that the allowed amount of tilt is controlled by the amount of aberration generated, and expression (9) can give a substantially general criterion for the amount of tilt that can be allowed.

However, when such a thin transparent substrate is used, there is the problem that, since the distance between a recording surface and the surface of the transparent substrate is short, there is the problem that data errors can occur easily due to fingerprints or dust.

FIG. 4 shows a relationship between a beam diameter a of a laser beam on the surface of a transparent substrate and the shape of the converging beam. When a focused spot is formed on a recording surface 1, the laser beam converges through a transparent substrate 2 having a thickness d along an optical path shown by the solid line. The lens numerical aperture NA is a value indicating convergence of a laser beam in air, and has the following relationship where the optical path in the transparent substrate 2 has a refractive index of n.

$$NA = \sin\beta \quad (10)$$

$$n \cdot \sin\beta' = \sin\beta \quad (11)$$

$$a = 2 \cdot d \cdot \tan\beta' \quad (12)$$

From these equations, the beam diameter a on the surface of the transparent substrate 2 can be obtained from the following equation.

$$a = 2 \cdot d \cdot \tan(\sin^{-1}(NA/n)) \quad (13)$$

FIG. 5 shows the thickness d of the transparent substrate and the beam diameter a on the surface of the transparent substrate when the lens numerical aperture NA is 0.6 and 0.85 and the refractive index n is 1.5.

In the conventional DVD, the thickness d of the transparent substrate is 600 μm and the lens numerical aperture NA is 0.60 and, as shown by the black star in the figure, the beam diameter on the surface of the transparent substrate is 500 μm or more. On the other hand, under the high-density conditions proposed in specification 1, since the thickness of the transparent substrate is 100 μm and the lens numerical aperture NA is 0.85, as shown by the white star in the figure, the beam diameter on the surface of the transparent substrate is about 150 μm, which is extremely small.

Taking as an example a case where a fingerprint is deposited, which is the most likely to occur in practice, the width of one line of the fingerprint is usually about 300 μm. When the beam diameter on the surface of the transparent substrate is smaller than this value, it can easily be imagined that the effect will be large.

When the beam diameter is as small as 150 μm on the surface of the transparent substrate, it is susceptible to fingerprints and dust, and practical application is therefore difficult unless a cartridge, etc. for protecting the optical disk medium is used.

Experiment shows that, in order to obtain practical fingerprint resistance and dust resistance at the same levels as those of the conventional DVD, it is necessary for the beam diameter on the surface of the transparent substrate to be at least 400 μm. Applying this value to the equation (13) gives the following expression, $$d \geq 200/\tan(\sin^{-1}(NA/n)) \quad (14)$$

and when the lens numerical aperture NA is 0.85, it is necessary for the thickness d of the transparent substrate to be at least 290 μm.

However, expression (9) suggests that, when the thickness d of the transparent substrate increases, the allowable amount of tilt decreases, and the two mutually contradictory characteristics cannot be satisfied.

SUMMARY OF THE INVENTION

The present invention has been achieved under the above-mentioned circumstances, and it is an object thereof to provide an optical disk medium and a drive system that enable high density recording using a transparent substrate having the same level of thickness as that of a conventional substrate, without causing the above-mentioned problems in terms of fingerprint resistance and dust resistance.

A preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; when the lens numerical aperture of an objective lens through which the laser beam irradiates the optical disk medium is denoted by NA, the wavelength of the laser beam is denoted by λ [μm], the refractive index of the transparent substrate or the transparent cover layer is denoted by n, the thickness of the transparent substrate or the transparent cover layer is denoted by d [μm], and the minimum pit length of pits formed on the recorded information tracks is denoted by Lp [μm], the relationships $d \geq 200/\tan(\sin^{-1}(NA/n))$ and $Lp \leq 0.35 \cdot \lambda/NA$ are satisfied; a change in the tilt of the surface of the optical disk medium over one circuit of each of the information tracks is equal to or less than a first predetermined value; and a change in the tilt over the entire surface of the optical disk medium is equal to or less than a second predetermined value, the second predetermined value being larger than the first predetermined value. The minimum pit length Lp [μm] of pits formed on the information tracks is preferably equal to or less than $0.33 \cdot \lambda/NA$.

Another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; when the lens numerical aperture of an objective lens through which the laser beam irradiates the optical disk medium is denoted by NA, the wavelength of the laser beam is denoted by λ [μm], the refractive index of the transparent substrate or the transparent cover layer is denoted by n, the thickness of the transparent substrate or the transparent cover layer is denoted by d [μm], and the minimum pit length of pits formed on the recorded information tracks is denoted by Lp [μm], the relationships $d \geq 200/\tan(\sin^{-1}(NA/n))$ and $Lp \leq 0.35 \cdot \lambda/NA$ are satisfied; a change in the tilt of the surface of the optical disk medium over one circuit of each of the information tracks is equal to or less than a first predetermined value; and a change in the tilt over the entire surface of the optical disk medium is equal to or more than the first predetermined value.

Still another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; when the lens numerical aperture of an objective lens through which the laser beam irradiates the optical disk medium is denoted by NA, the wavelength of the laser beam is denoted by λ [μm], the refractive index of the transparent substrate or the transparent cover layer is denoted by n, the thickness of the transparent substrate or the transparent cover layer is denoted by d [μm], and the minimum pit length of pits formed on the recorded information tracks is denoted by Lp [μm], the relationships $d \geq 200/\tan(\sin^{-1}(NA/n))$ and $Lp \leq 0.35 \cdot \lambda/NA$ are satisfied; a change in the tilt in a direction orthogonal to the track of the surface of the optical disk medium over one circuit of each of the information tracks is equal to or less than a first predetermined value; a change in the tilt in the track direction over the entire surface of the optical disk medium is equal to or less than a second predetermined value; and a change in the tilt in the direction orthogonal to the track over the entire surface of the optical disk medium is equal to or less than a third predetermined value, the third predetermined value being larger than the first predetermined value, and the third predetermined value being larger than the second predetermined value.

Still another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; when the lens numerical aperture of an objective lens through which the laser beam irradiates the optical disk medium is denoted by NA, the wavelength of the laser beam is denoted by $\lambda$ [μm], the refractive index of the transparent substrate or the transparent cover layer is denoted by n, the thickness of the transparent substrate or the transparent cover layer is denoted by d [μm], and the minimum pit length of pits formed on the information tracks is denoted by Lp [μm], the relationships $d \geq 200/\tan(\sin^{-1}(NA/n))$ and $Lp \leq 0.35 \cdot \lambda/NA$ are satisfied; a change in the tilt in a direction orthogonal to the track of the surface of the optical disk medium over one circuit of each of the information tracks is equal to or less than a first predetermined value; a change in the tilt in the direction orthogonal to the track over the entire surface of the optical disk medium is equal to or more than the first predetermined value; and a change in the tilt in the track direction over the entire surface of the optical disk medium is equal to or less than a second predetermined value.

Examples of the material for the transparent substrate and the transparent cover layer include high molecular weight plastic materials such as polycarbonate and polymethyl methacrylate. The refractive indexes of these materials are generally about 1.5 to about 1.6. The structure of the optical disk medium is, for example, a structure in which a phase change recording material is laminated as a recording layer on the transparent substrate. As an example of the structure of the recording layer, $ZnS$—$SiO_2$, $Ge_2Sb_2Te_5$, $ZnS$—$SiO_2$, and Al—Ti are laminated in that order on the top of the transparent substrate.

Satisfying these conditions can suppress the playback error rate to an allowable range. This is particularly effective in achieving a higher density for an optical disk medium. It is also possible to set the first predetermined value at $38 \cdot \lambda/(NA^3 \cdot d) \cdot n^3/(n^2-1)$ [deg] or less. Setting the change in the tilt of the surface of the optical disk medium over one circuit of each of the information tracks at $38 \cdot \lambda/(NA^3 \cdot d) \cdot n^3/(n^2-1)$ [deg] can further decrease the playback error rate.

Still another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; a change in the tilt of the surface of the optical disk medium over one circuit of each of the information tracks is equal to or less than a first predetermined value; a change in the tilt over the entire surface of the optical disk medium is equal to or less than a second predetermined value; and when the lens numerical aperture of an objective lens through which the laser beam irradiates the optical disk medium is denoted by NA, the wavelength of the laser beam is denoted by $\lambda$ [μm], the thickness of the transparent substrate or the transparent cover layer is denoted by d [μm], the refractive index thereof is denoted by n, the minimum pit length of pits formed on the information tracks is denoted by Lp [μm], the first predetermined value is $\theta a$ [deg], and the second predetermined value is $\theta b$ [deg], the relationships $Lp \leq 0.35 \cdot \lambda/NA$, $\theta a \leq 38 \cdot \lambda/(NA^3 \cdot d) \cdot n^3/(n^2-1)$, $d \geq 200/\tan(\sin^{-1}(NA/n))$, and $\theta a < \theta b$ are satisfied.

Still another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; a change in the tilt of the surface of the optical disk medium over one circuit of each of the information tracks is equal to or less than a first predetermined value; and when the wavelength of the laser beam for recording/playback is denoted by $\lambda$ [μm], the lens numerical aperture of an objective lens through which the laser beam irradiates the optical disk medium is denoted by NA, the thickness of the transparent substrate or the transparent cover layer is denoted by d [μm], the refractive index thereof is denoted by n, the minimum pit length of pits formed on the information tracks is denoted by Lp [μm], and the first predetermined value is $\theta a$ [deg], the relationships $Lp \leq 0.35 \cdot \lambda/NA$, $\theta a \leq 38 \cdot \lambda/(NA^3 \cdot d) \cdot n^3/(n^2-1)$, and $d \geq 200/\tan(\sin^{-1}(NA/n))$ are satisfied. It is also possible to set the change in the tilt over the entire surface of the optical disk medium to be equal to or greater than the first predetermined value.

Still another preferred embodiment according to the present invention relates to an optical disk medium. This optical disk medium is a disk-shaped optical disk medium in which recorded information tracks are formed in a concentric or spiral manner, and information is recorded and played back by irradiating the recorded information tracks with a laser beam through a transparent substrate or a transparent cover layer; a change in the tilt in a direction orthogonal to the track of the surface of the optical disk medium over one circuit of each of the information tracks is equal to or less than a first predetermined value; a change in the tilt in the track direction over the entire surface of the optical disk medium is equal to or less than a second predetermined value; a change in the tilt in the direction orthogonal to the track over the entire surface of the optical disk medium is equal to or less than a third predetermined value; and when the wavelength of the laser beam for recording/playback is denoted by $\lambda$ [μm], the lens numerical aperture of an objective lens through which the laser beam irradiates the optical disk medium is denoted by NA, the thickness of the transparent substrate or the transparent cover layer is denoted by d [μm], the refractive index thereof is denoted by n, the minimum pit length of pits formed on the information tracks is denoted by Lp [μm], the first predetermined value is $\theta a$ [deg], the second predetermined value is $\theta b$ [deg], and the third predetermined value is $\theta c$ [deg], the relationships $Lp \leq 0.35 \cdot \lambda/NA$, $\theta a \leq 38 \cdot \lambda/(NA^3 \cdot d) \cdot n^3/(n^2-1)$, $\theta b \leq 38 \cdot \lambda/(NA^3 \cdot d) \cdot n^3/(n^2-1)$, $\theta c \leq 38 \cdot \lambda/(NA^3 \cdot d) \cdot n^3/(n^2-1)$, $\theta a \leq \theta c$, $\theta b \leq \theta c$, and $d \geq 200/\tan(\sin^{-1}(NA/n))$ are satisfied.

With regard to an optical disk medium that has been deformed into, for example, a parabolic shape, tolerating such deformation can suppress any increase in the production cost of the optical disk medium. This is particularly effective when it is necessary for the first predetermined value to be equal to or less than $38 \cdot \lambda/(NA^3 \cdot d) \cdot n^3/(n^2-1)$ [deg].

The wavelength of the laser beam for recording/playback can be at least 0.40 μm and at most 0.42 μm, and the lens numerical aperture can be at least 0.6. Even when the wavelength of the optical laser is changed from the conventional 0.65 μm to the above-mentioned range, there is no need to increase the lens numerical aperture of the objective lens, and the degrees of freedom in designing a drive system are thus increased. The first predetermined value $\theta a$ can be at least 0.1 deg and less than 0.25 deg, thus further decreasing the playback error rate.

The second predetermined value can be at least 0.1 deg and less than 0.25 deg. Setting the tilt change in this range can restrict the playback error rate to within an allowable range while keeping down the production cost of the optical disk medium.

Still another preferred embodiment according to the present invention relates to a drive system. This drive system is a drive system for recording or playing back the above optical disk medium and has a control function that compensates for aberration caused by the tilt between an objective lens of the drive system and the optical disk medium. The control bandwidth of the function may be set lower than the rotational period of the optical disk medium.

The drive system for recording or playing back the optical disk medium may employ a PRML (Partial Response Maximum Likelihood) system for signal reproduction. This PRML system combines a technique of pulse shaping related to multiple value equalization called partial response, and a maximum likelihood decoding method in which the most likely sequence is Viterbi-decoded using a correlation between signal sequences due to waveform interference, and is effective in stably reproducing a high density recorded signal.

The drive system having such an arrangement can decrease the playback error rate while suppressing any increase in the production cost of the drive system.

As hereinbefore described, in accordance with the present invention, the thickness of the transparent substrate or the transparent cover layer provided as a protective layer over the entire surface of the optical disk medium can be set at a thickness such that the optical disk medium is not susceptible to fingerprints, dust, etc., thereby removing a main cause of an increase in the production cost of the optical disk medium.

Any combination of the above-mentioned components, and conversion of the expression of the present invention between a method, a system, etc. are also effective as a mode of the present invention.

This summary of the invention does not necessarily describe all necessary features so that the invention may also be a sub-combination of these described features.

BRIEF DESCRIPTION OF THE DRAWINGS

FIG. 13 a graph showing the amount of tilt and the tilt characteristics of the playback error rate in the embodiment;

DETAILED DESCRIPTION OF THE INVENTION

The invention will now be described based on the preferred embodiments. This does not intend to limit the scope of the present invention, but exemplify the invention.

A preferred embodiment of the present invention is explained below. In a case where the thickness d of a transparent substrate is not reduced, it is difficult to increase the lens numerical aperture NA without limitation due to the tilt limit determined by the above expression (5). In particular, the tilt margin can only be made to decrease by changing the wavelength of a laser beam from the 0.65 μm of a red laser to the 0.4 to 0.42 μm made possible by use of a blue laser. This wavelength band is currently unique in being put into practice for the direct oscillation of a semiconductor laser, and is practically effective in realizing a higher density of the optical disk medium.

Figure 1:
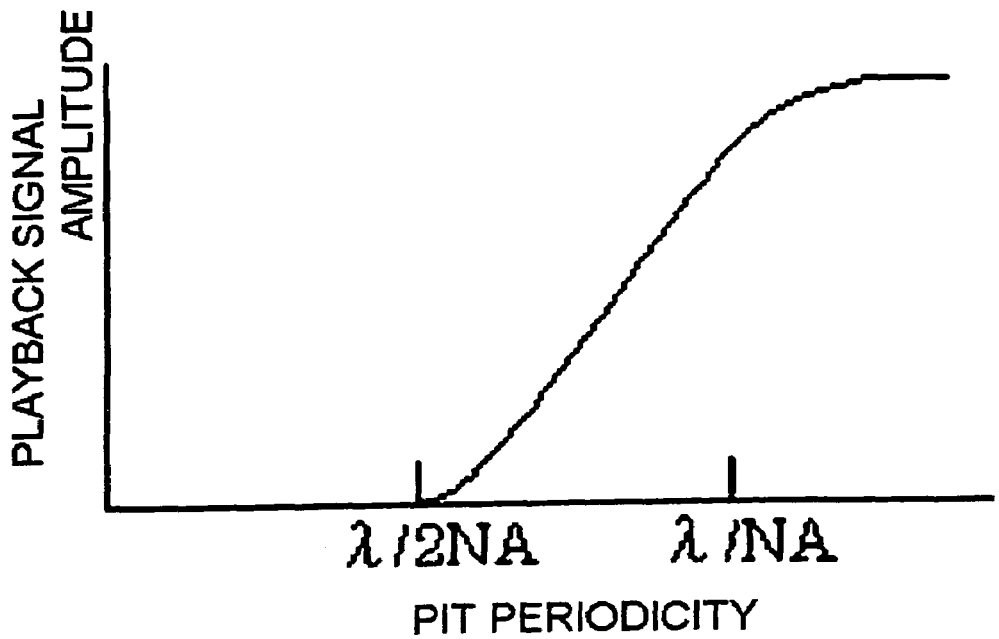
FIG. 1 is a graph showing amplitude characteristics of a playback signal.
Figure 2:
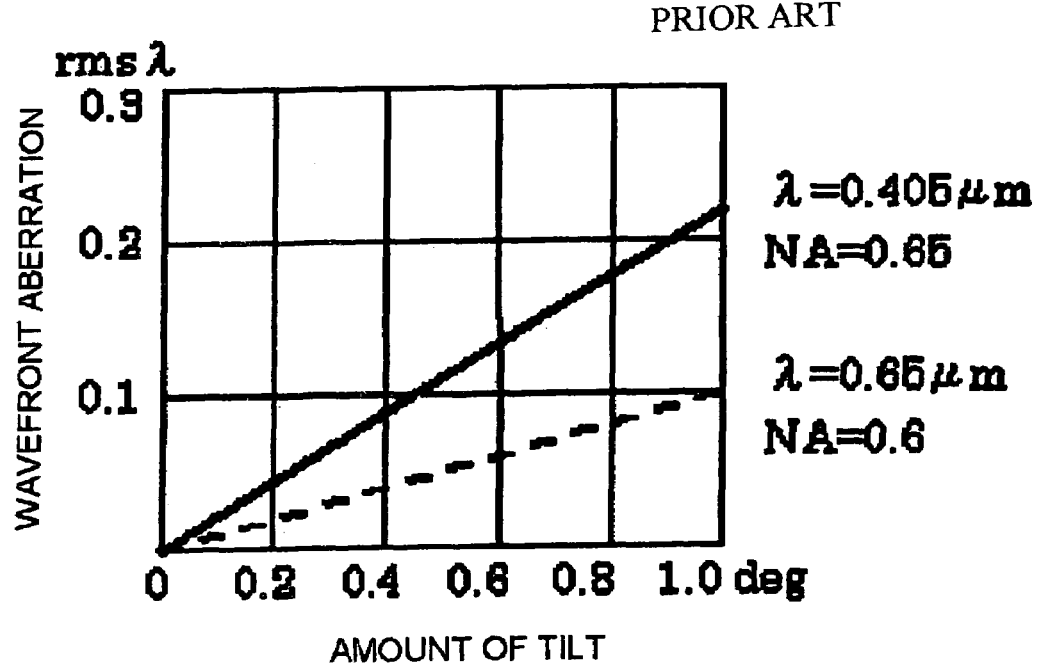
FIG. 2 is a graph showing relationships between the amount of tilt and the wavefront aberration.
Figure 3:
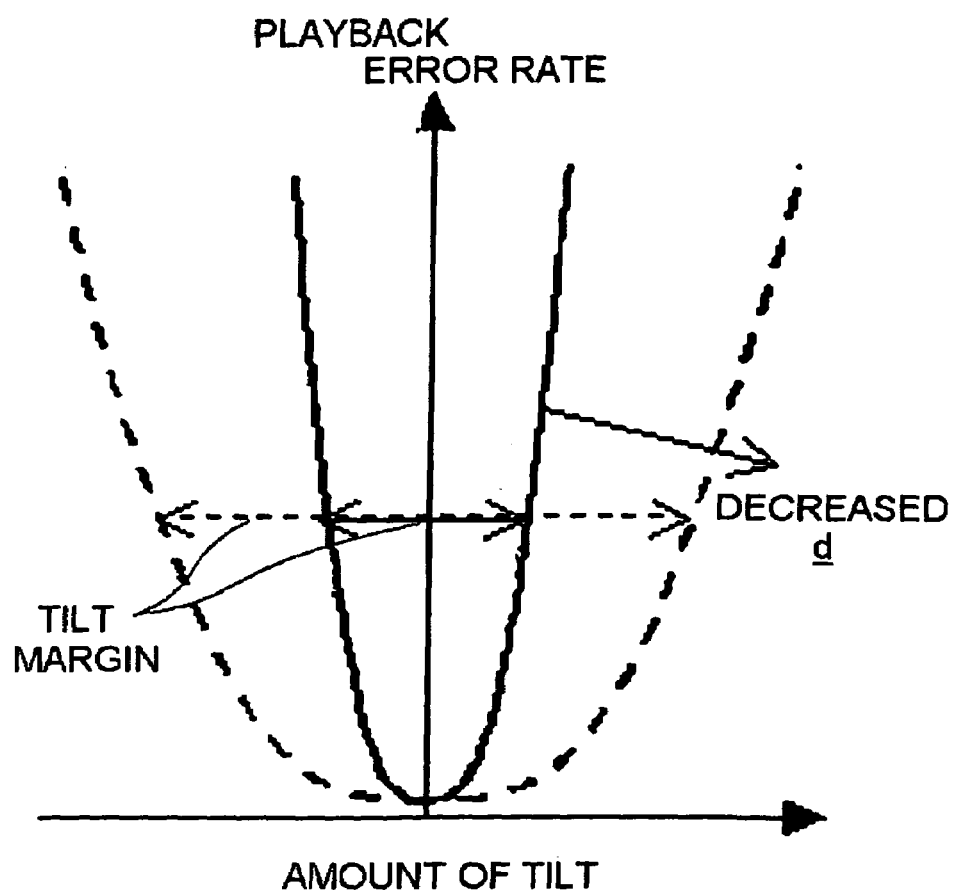
FIG. 3 is a graph showing the amount of tilt and the tilt characteristics of the playback error rate in the conventional technology.
Figure 4:
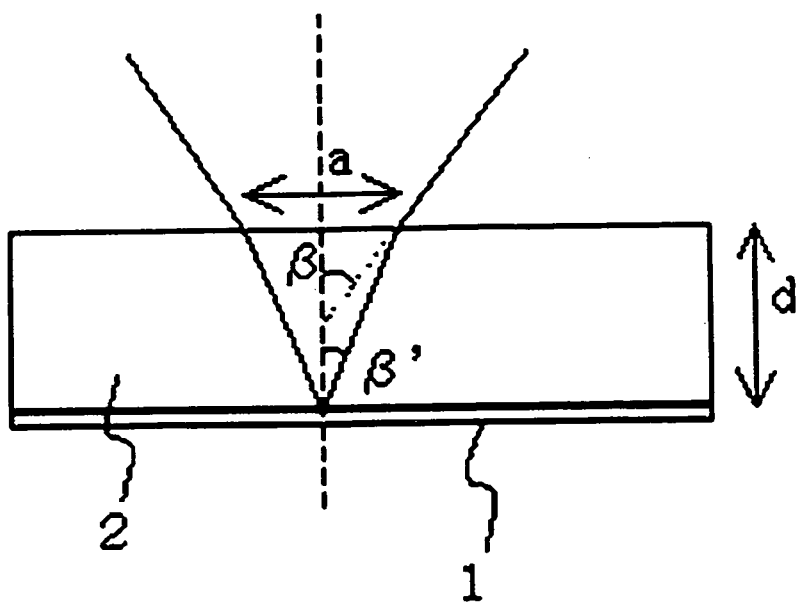
FIG. 4 is a diagram for explaining the beam spot diameter on the entire surface of an optical disk medium.
Figure 5:
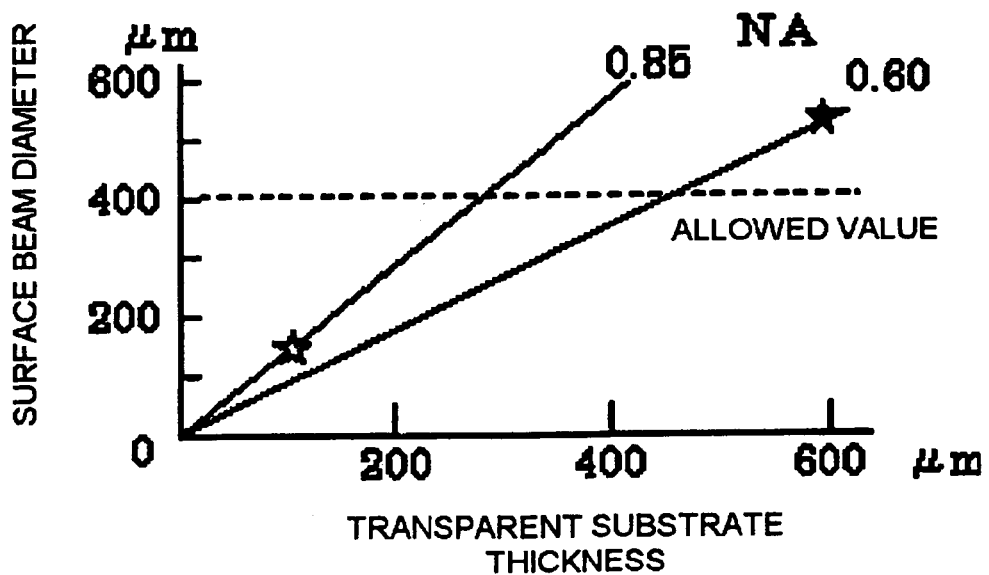
FIG. 5 is a graph showing relationships between the surface beam spot diameter and the thickness of a transparent substrate.

For example, when the wavelength $\lambda$ is 0.405 μm, the lens numerical aperture NA is 0.65, and the thickness d is 600 μm, the amount of wavefront aberration generated relative to the tilt has the characteristics shown by the solid line in FIG. 2. For the same amount of tilt, the amount of wavefront aberration is about 2 times that occurring under the DVD conditions shown by the broken line.

When changing the wavelength $\lambda$ and the lens numerical aperture NA in this way, the reduction in the minimum pit length Lp given by expression (3) is about 1.7 times which, combined with an increase in the track density, gives a capacity increase of about 3 times that of DVD on a recording capacity basis, and the capacity is almost 14 GB. 15 GB is considered to be one criterion for a practically meaningful capacity. If, at the expense of a little of the recording/playback margin compared with DVD, Lp in expression (3) is made to be about 0.34·$\lambda$/NA, the linear recording density will increase about 10% because of the ratio 0.37:0.34, and a capacity of 15 GB is feasible.

Furthermore, with the aim of guaranteeing the recording margin and achieving a high linear recording density, an attempt has been made to reduce the error rate using the PRML system.

Figure 6:
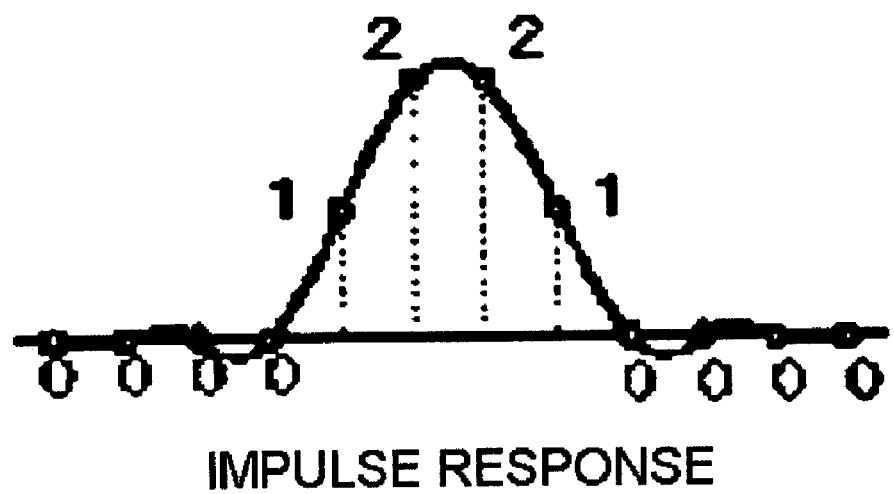
FIG. 6 is a graph showing an example of a partial response equalized waveform when there is an impulse input.

FIG. 6 shows an example of a partial response equalized waveform when there is an impulse input. In the case of simple two-value slicing, the waveform equalization is carried out so that the value of a specific data clock point is 1 and the values of other clock points are 0. However, when the recording density increases and approaches the optical cutoff conditions, and the difference in the amplitude between a playback signal from a short mark and a playback signal from a long mark becomes large, it is difficult to carry out the simple two-value equalization. It is therefore easier to equalize to a waveform having values at several data clock points. This figure shows a waveform obtained by PR (1, 2, 2, 1) equalization in which a sequence of 4 data clock points are equalized so as to have the values '1, 2, 2, 1'.

Figure 7:
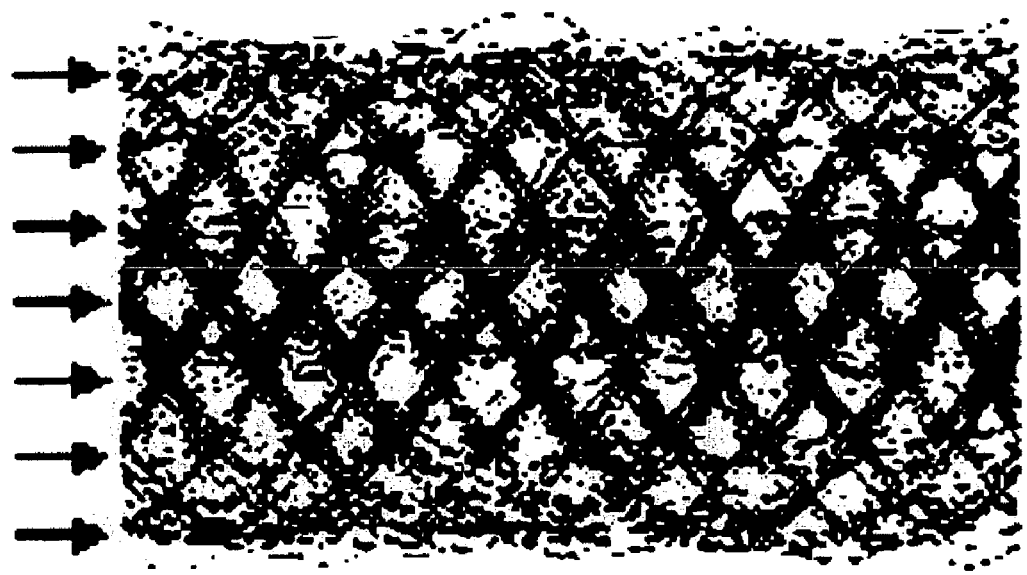
FIG. 7 is a diagram showing an example of a PR (1, 2, 2, 1) equalized eye pattern.

FIG. 7 shows an example of a case where the PR (1, 2, 2, 1) equalization was carried out for a random signal waveform. As shown by the levels of arrows, one clock point has 7 values of level 0 to level 6. An original signal sequence is therefore reproduced by a 7-value evaluation instead of a simple 2-value evaluation of 0 and 1.

Viterbi decoding is a system in which the most likely original signal sequence is reproduced by confirming the data sequence during a plurality of clock periods using a level transition restriction between adjacent clock points such that 'there is no abrupt shift from level 0 to level 6'.

Figure 9:
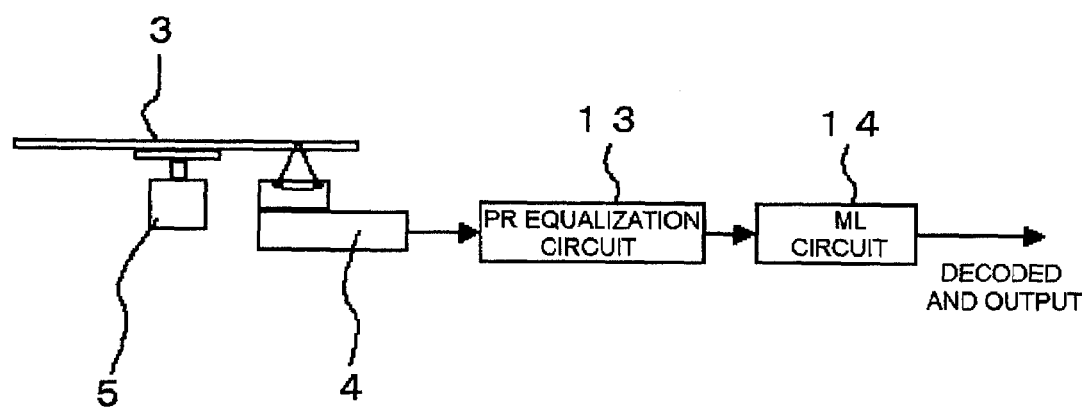
FIG. 9 is a diagram showing an example of the constitution of a system employing a PRML system.

FIG. 9 shows an example of the constitution of a system carrying out recording and playback of an optical disk medium 3. A signal is played back from the optical disk medium 3, which is set on a spindle 5, by means of an optical head 4. The playback signal is decoded and output by means of a PR (Partial Response) equalization circuit 13, which processes the signal by a partial response equalization algorithm, and a ML (Maximum Likelihood) circuit 14, which processes the signal by a maximum likelihood decoding algorithm. These playback signal circuits such as the PR equalization circuit 13 and the ML circuit 14 can be formed easily by LSI (Large Scale Integration).

Use of this technique confirms that feasible error rate characteristics as in the conventional method can be satisfied even beyond the limit shown by the expression $$Lp \leq 0.35 \cdot \lambda/NA \quad (15)$$

at which the error rate increases rapidly when employing the conventional method in which a playback signal is discriminated by 2 values.

Figure 10:
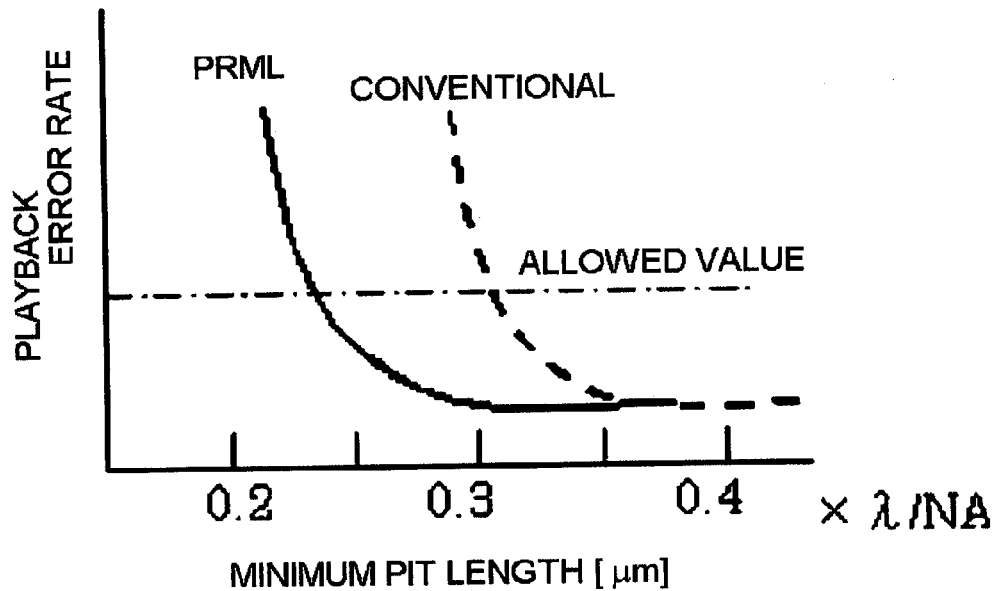
FIG. 10 is a graph showing linear recording density characteristics of a conventional playback system and a PRML playback system.

FIG. 10 shows relationships between the minimum pit length and the playback error rate when the 1–7 encoding method is used. The ordinate is expressed as a log scale. The allowed value for the bit error rate of a raw signal is about $1 \times 10^{-4}$, and in the conventional system the error rate starts to deteriorate rapidly as the minimum pit length Lp goes beyond $0.35 \cdot (\lambda/NA)$ μm, and crosses the allowed value when it is in the vicinity of $0.30 \cdot (\lambda/NA)$ μm.

When the wavelength λ is 0.405 μm and the lens numerical aperture NA is 0.65, the error rate starts deteriorating when the minimum pit length Lp is 0.22 μm and reaches the limit when it is 0.19 μm.

On the other hand, use of the PRML system enables an error rate that is equal to or less than the allowed value to be achieved while going beyond this limit. The minimum pit length Lp at which the error rate crosses the allowed value is in the vicinity of $0.23 \cdot (\lambda/NA)$ μm. In FIG. 10, the partial response equalization using the PRML system is optimized for each density condition; when the minimum pit length Lp is around $0.3 \cdot (\lambda/NA)$ μm, PR (1, 2, 2, 1) equalization is employed, and when the minimum pit length Lp is around $0.25 \cdot (\lambda/NA)$ μm, PR (1, 2, 2, 2, 1) equalization is employed.

Figure 8:
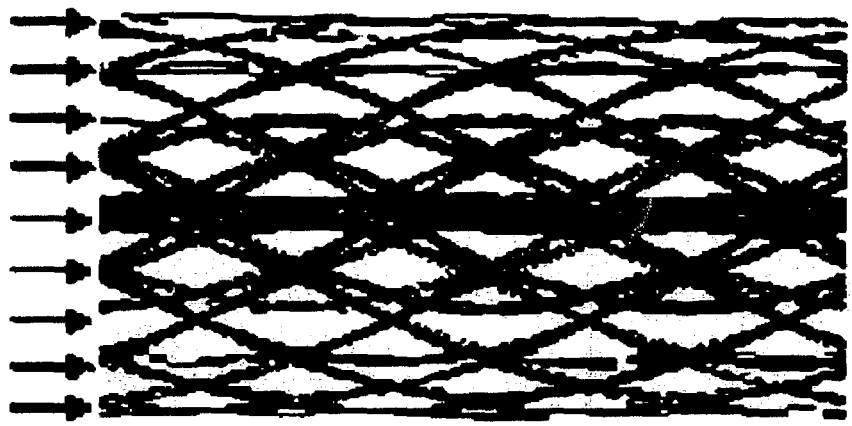
FIG. 8 is a diagram showing an example of a PR (1, 2, 2, 2, 1) equalized eye pattern.

In FIG. 10, in the case of use of the PRML system, even when the minimum pit length Lp is $0.25 \cdot (\lambda/NA)$ μm, which corresponds to the optical cutoff condition, it is possible to realize an error rate that satisfies the allowed value adequately. This is due to the characteristics of the PR (1, 2, 2, 2, 1) equalization. FIG. 8 shows eye pattern waveforms when the PR (1, 2, 2, 2, 1) equalization was carried out. As shown by the arrows, there are nine equalization levels of level 0 to level 8. In the waveform around level 4, which is the center of the above levels, the eye is barely open. That is, when the PR (1, 2, 2, 2, 1) equalization is used, it is only assumed that a signal from the smallest period pit has an amplitude of 0, and gives a reflectivity that is between 'pit' and 'no pit'. Therefore, as in the conventional system, since it does not depend on the S/N of a signal from a short pit, and the S/N of a signal from a long pit is the dominant factor, even when the minimum pit length falls outside the optical cutoff conditions, an error rate that is equal to or less than the allowed value can be achieved.

Since the linear recording density is increased by employing the PRML system, a capacity of 15 GB or higher can be realized even for a lens numerical aperture NA of 0.65. Further improving the S/N characteristics of the optical disk medium can realize a capacity of 20 GB or higher, which is the same level as that of the proposed optical disk standard using a lens numerical aperture NA of 0.85 of specification 1.

Conversely, unless the linear recording density increases to a range that satisfies expression (15), a sufficient recording capacity cannot be realized and the practical merit is small.

Figure 11:
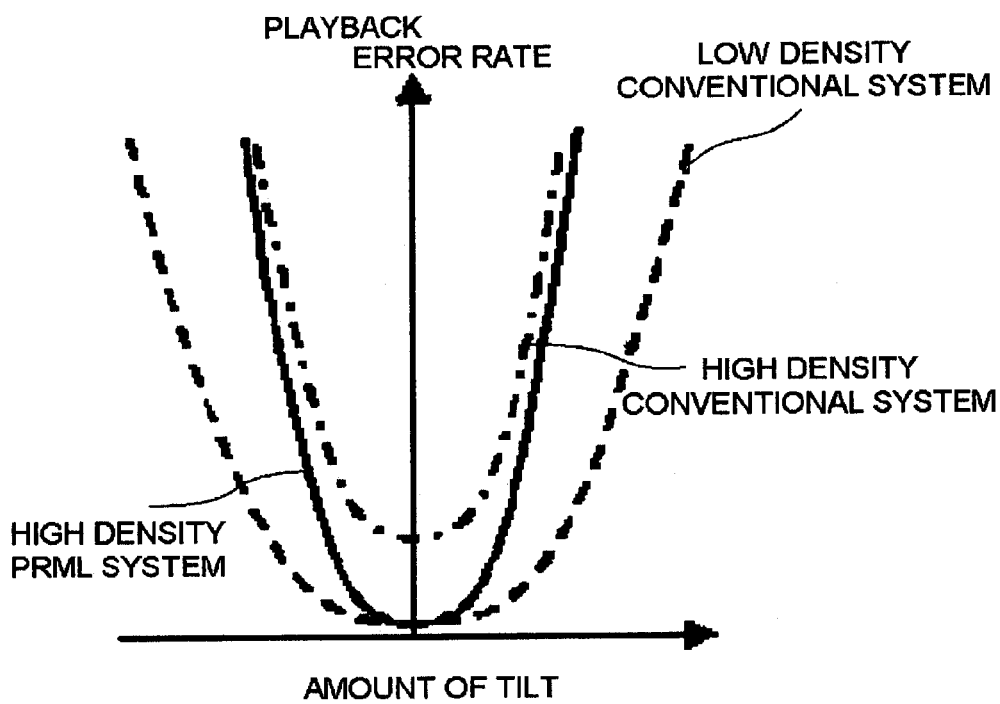
FIG. 11 is a graph showing tilt characteristics of the conventional technology and an embodiment of the present invention.

The problem arising here is a degradation in the tilt characteristics caused when using a thick transparent substrate. FIG. 11 shows a comparison of the tilt characteristics obtained under the three different conditions. In comparison with the characteristics shown by the broken line obtained by the conventional signal playback system with a low density, in the characteristics shown by the single dotted broken line obtained when the wavelength λ is shortened, the lens numerical number NA is increased and the density is increased, the bottom value of the error rate at the optimum amount of tilt increases, and the gradient of the characteristics become more steep. Applying the PRML system under these conditions can reduce the optimum value of the error rate as shown by the solid line to a level obtained by the conventional system. However, this change in the tilt characteristics is not very large.

That is, it is clear from these characteristics that the tilt characteristics are mainly controlled by the optical aberration represented by expression (6), and do not greatly depend on the playback system. Since 'the tilt characteristics are determined by the optical aberration', it can be easily imagined that the tilt characteristics will show a similar tendency when the encoding method employs the 8/16 modulation coding used for DVD instead of the 1–7 coding.

This is the same result as the allowed value for the tilt being controlled by the amount of aberration generated, as in the previously determined expression (8). When NA is 0.65, λ is 0.405 μm, and d is 600 μm, the allowed value is 0.245 deg or less from expression (8).

The problem with the tilt characteristics in an actual drive system is that, when setting and rotating an optical disk medium on a turntable of the drive system, the tilt in the vertical direction of the optical disk medium relative to the optical axis of the objective lens for recording and playback changes from area to area due to warpage of the optical disk substrate, etc.

In the conventional optical disk medium standard, restricting the level of this change to the tilt margin value or below can ensure that the characteristics are adequate. For example, in the case of DVD-ROM, while the tilt margin can be maintained at 0.5 deg or more, restricting the change in tilt of the optical disk medium to 0.4 deg or less and the amount of wavefront aberration to 0.04 rmsλ or less can ensure that adequate characteristics can be obtained regardless of variations in the drive systems.

On the other hand, as targeted by the present invention when the wavelength λ is changed from 0.65 μm to 0.405

μm, the lens numerical aperture NA is changed from 0.6 to 0.65 and, furthermore, the density is increased as shown in expression (15) in order to ensure a practical capacity, since the tilt margin decreases to about half of the conventional DVD, the optical disk medium cannot be allowed to have the same tilt as that of the DVD. The amount of tilt that gives an amount of wavefront aberration of 0.04 rmsλ is 0.2 deg or less, as in FIG. 2. Even when using expression (8) in which the allowed value for the aberration is estimated to be 0.05 rmsλ, the allowed value for the tilt is 0.25 deg or less, which is more stringent than DVD.

As one method for solving the above-mentioned problems, strictly specifying the change of the tilt can be considered, but improving the production precision of an optical disk medium and increasing the number of imperfect products by inspection will disadvantageously cause a rise in the cost.

As another method, there is a method in which deterioration of the signal playback characteristics is prevented by changing the tilt of the objective lens of the drive system in response to a change of the tilt of the optical disk medium so as to decrease the relative tilt.

However, in order to track the tilt, which changes in response to rotation of the optical disk medium, it is necessary to subject the tilt of the objective lens to servo control with a high bandwidth that is equal to or higher than the rotational speed. The rotational speed is as high as 100 Hz or more in some systems, and realizing a servo control that can cater for such a high bandwidth will greatly increase the cost of the drive system.

The present invention therefore proposes a method that can realize high density characteristics by only making the lens tilt follow slow changes in tilt during recording or playback of the optical disk medium, without significantly changing the costs of the optical disk medium and the drive system.

That is, it is specified that the tilt change during one circuit of a spiral or concentric track provided on a disk-shaped optical disk medium is equal to or less than a predetermined margin value, the tilt change over the entire surface of the optical disk medium is allowed to be equal to or greater than the predetermined margin value, and it is compensated for by, for example, controlling the tilt of the lens of the drive system so as to coincide with a slow component of the change of tilt of the optical disk medium.

When a recording signal on an optical disk medium is played back, the signal is usually read out by making an optical beam spot track in the track direction. Since the information track is formed in a spiral shape, as the track is tracked the circumferential position changes in response to the rotational speed, but the radial position changes only slightly by one pitch of the track during one rotation. For example, when a track having a track pitch p of 0.5 μm is tracked at a liner velocity v of 5 m/s at a radial position r of 30 mm, the radial speed of travel v' is v×P/(2πr), which is only 13 μm/s. There is of course a case where the spot is moved in the radial direction at a high speed during accessing, but during this a signal is not read out and there is no problem if the tilt increases to some extent.

A practical optical disk system can therefore be realized by only restricting the change of tilt during one circuit of the optical disk and compensating for the change of tilt due to radial movement by tilt control with a comparatively slow motion bandwidth.

With regard to a method for the tilt control, for example, a band pass filter that passes only a low frequency component of a detected tilt change signal can be used.

Since the tilt change during one rotation is restricted to an allowed value or less, the cutoff frequency on the high frequency side of the band pass filter can be set at a rotational frequency or less.

As is clear from the previous calculation example, the speed of travel in the track direction and the speed of travel in a radial direction orthogonal to the track are different by five orders of magnitude or more. If the cutoff frequency on the high frequency side of the band pass filter has characteristics such that it can track an average value during one rotation of the linear velocity, it can adequately track the change in radial velocity. As a result, since adequate characteristics can be obtained with a value that is one tenth or less of the rotational component, when the rotational speed is 100 Hz, the cutoff frequency on the high frequency side of the band pass filter can be 10 Hz or less, which can be adequately realized at low cost.

Figure 12:
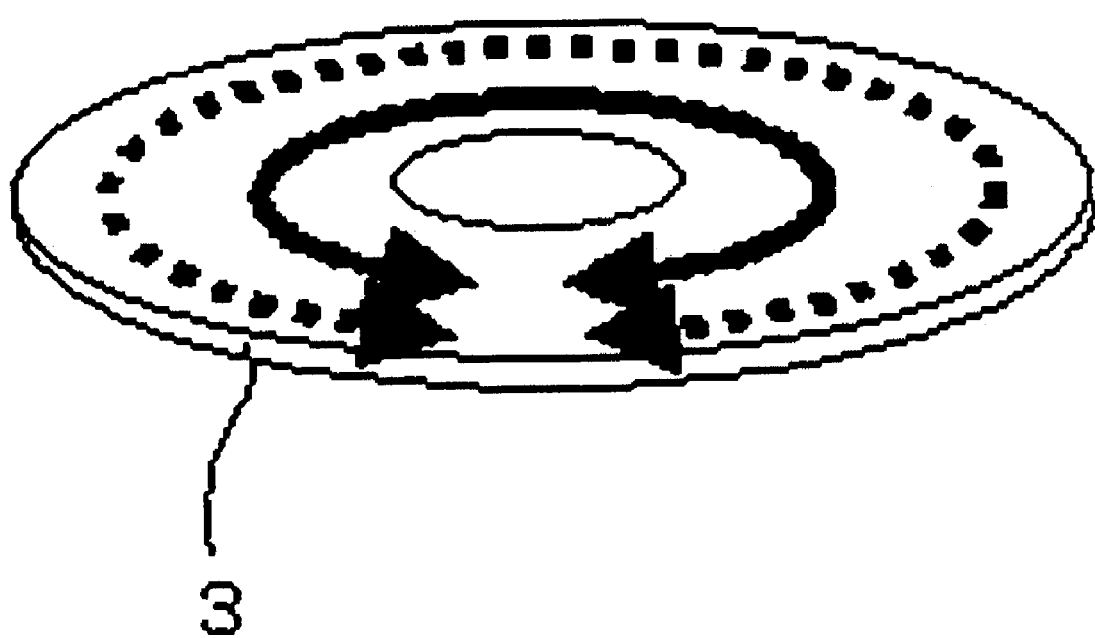
FIG. 12 is a diagram showing the optical disk medium according to the embodiment.

In the present invention, as shown by an optical disk medium 3 in FIG. 12, spiral or concentric recording tracks are formed on the disk-shaped optical disk medium 3 around the center of rotation. It is specified that the changes of the tilt of the recording tracks during one circuit as shown by the solid line and the broken line are at a predetermined margin value or less. That is, a tilt margin that has some leeway is obtained from the tilt characteristics of the error rate, and a predetermined value θ for the tilt change is determined. When the entire surface of the optical disk medium 3 is considered, a change in tilt of θ or more between an inner track having a small radius and an outer track having a larger radius can be allowed.

Although it is possible not to restrict the allowed value for the tilt over the entire surface of the optical disk medium 3, since it is impossible in practice to increase without limit the range that the drive system compensates for, it is desirable for the amount of tilt of the entire surface of the optical disk medium 3 to a fixed value or less.

In the present invention, when the tilt change during one circuit of a track has a first predetermined allowed value θa, and the tilt change over the entire surface of the optical disk medium has a second predetermined allowed value θb, they are set so as to satisfy the relationship θa<θb.

In practice, the second predetermined allowed value θb can be set at about 0.4 deg, which is about the same as that of the conventional DVD.

FIG. 13 shows a relationship between the amount of tilt and the tilt characteristics of the playback error rate. The variation range θ during one circuit is restricted so that the error rate is equal to or less than the allowed value, but the variation over the entire surface of the optical disk medium is allowed to be large. Controlling the optical axis of the lens of the drive system at an average value of the tilt during one circuit of each of the tracks can achieve an error rate that is always equal to or less than the allowed value. The range of variation over the entire surface of the optical disk medium shown in FIG. 13 shows the change of tilt of the axis perpendicular to the optical disk medium relative to the lens optical axis when the lens optical axis is not controlled, but when tilt control is carried out, it is restricted to within the one circuit variation range.

With regard to the conventional drive systems, there is an example in which the lens tilt is similarly controlled by a lower control bandwidth than the rotational speed. However, in this conventional case, the purpose is to accommodate to some extent poor, out of standard, optical disk media, and the manner in which the tilt of the optical disk medium changes is not specified. Because of this, there are optical disk media whose tilt changes greatly during one circuit, and they are not adequately accommodated.

Figure 14A:
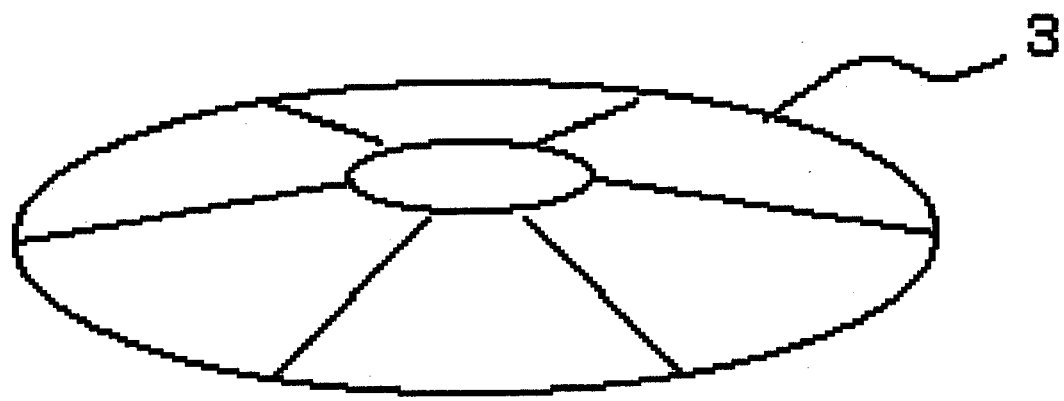
FIG. 14A is a diagram showing example of the parabolic shape of the optical disk medium.

In the case where the tilt change during one circuit of a track is smaller than that over the surface of the optical disk medium, the shape of the optical disk medium is a parabolic shape as shown in FIG. 14A. This is a structure in which the change in the circumferential direction is small but the change in the radial direction is large.

Figure 14B:
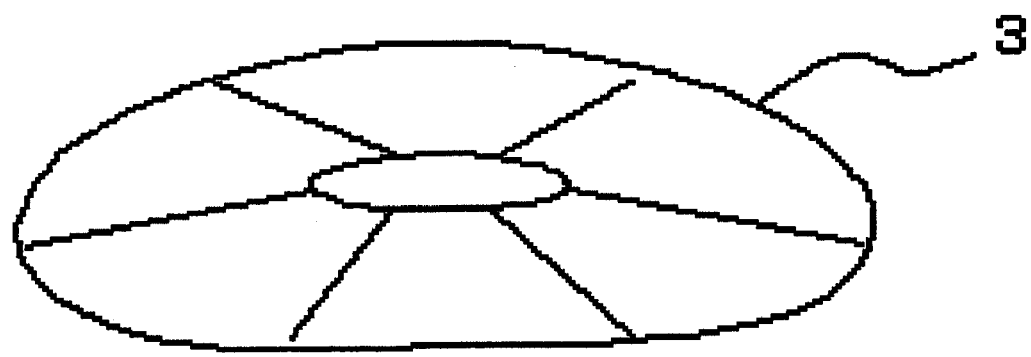
FIG. 14B is a diagram showing example of the potato chip shape of the optical disk medium.

On the other hand, in the case where the change in the circumferential direction is large but the change in the radial direction is small, the shape of the optical disk medium is a potato chip shape as shown in FIG. 14B. In the present embodiment, allowing deformation into a parabolic shape can realize a high density optical disk medium without causing a large increase in the production cost of the optical disk medium.

In a production method 1 used for conventional DVDs, etc., when two optical disk substrates are laminated to each other, the surfaces to be laminated are coated with an adhesive, and flat plates, etc. are then pressed from opposite sides so as to laminate them without causing warpage. By so doing, the tilt over the entire surface of the optical disk medium can be suppressed to some extent, but release of the strain, etc. in the optical disk substrate is variable, and when the optical disk medium is removed from the flat plates, the residual distortion causes deformation into either the parabolic shape or the potato chip shape according to the type of distortion.

In the present embodiment that can allow some degree of deformation into a parabolic shape, regarding the production process 1, two optical disk substrates may be simply brought into intimate contact with each other without particularly pressing by means of flat plates, etc. when they are laminated. The production method in which two optical disk substrates are simply brought into intimate contact is called production method 2. As a result of carrying out the actual production of an optical disk medium by the production method 2, it has been confirmed that since non-uniform distortion does not remain within the optical disk substrates, the distortion is uniform, and the only deformation generated in the optical disk medium is that of the parabolic shape.

When the predetermined value $\theta$ for the tilt change is set to less than 0.25 deg, the predetermined value $\theta$ is about 60% of the allowed value for tilt of the conventional DVD standard for tilt, and this is sufficiently feasible by current techniques for producing an optical disk medium without causing a significant increase in the cost.

It is desirable for the predetermined value $\theta$ of the tilt change to be as small as possible, but when the cost of the optical disk medium is taken into consideration, it is appropriate for it to be 0.1 deg or more. As a result of actually forming a prototype of the optical disk medium, it has been confirmed that mass-production is possible when the predetermined value for the tilt change is in the range of 0.1 to 0.25 deg.

When referring to the tilt, it is generally divided into the tilt characteristics in the track direction and in a direction orthogonal to the track, but in the above-mentioned explanation the direction of the tilt is not particularly specified. This is because the two tilt characteristics are substantially identical to each other since the allowed value for tilt is determined by the amount of wavefront aberration and the amount of wavefront aberration is constant regardless of the tilt direction.

However, controlling the tilt in the two directions by the drive system is somewhat complicated. In the embodiment described in the explanation below, the tilt of the optical disk medium is specified independently in the track direction and in a direction orthogonal to the track.

The tilt in the track direction is the tilt in the circumferential direction of the optical disk medium, and it is generally easier to make the tilt in the track direction of the optical disk medium smaller than that in the radial direction, which is the direction orthogonal to the track, and in the conventional DVD standard the tilt in the track direction is 0.15 deg, which is less than half of the 0.4 deg for the tilt in the direction orthogonal to the track.

Therefore, only for the direction orthogonal to the track, the tilt change during one circuit is set to be equal to or less than a first predetermined value $\theta 1$ within the margin range, and the tilt change over the entire surface of the optical disk medium is set to be equal to or less than a second predetermined value $\theta 2$, and for the track direction, the tilt change over the entire surface of the optical disk medium is set to be equal to or less than a third predetermined value $\theta 3$. The conditions are such that $\theta 1 < \theta 2$ and $\theta 3 < \theta 2$.

In this case, there is the advantage that, since it is not necessary to carry out tilt control in the track direction by means of the drive system, only tilt control in the direction orthogonal to the track is carried out. It is of course possible to specify the optical disk medium by only the conditions for the first predetermined value $\theta 1$ and the third predetermined value $\theta 3$ without specifying the second predetermined value $\theta 2$. In this case, it is necessary for the drive system to correct the amount of tilt over a wide range.

If the tilt margin in the track direction and the tilt margin in the direction orthogonal to the track are substantially identical, the first predetermined value $\theta 1$ and the third predetermined value $\theta 3$ may be the same, or in accordance with the production capability of the optical disk medium, the third predetermined value $\theta 3$ may be set slightly more strictly, and the first predetermined value $\theta 1$ set slightly more loosely. In either case, in order to satisfy the playback characteristics it is desirable for the predetermined value $\theta$ to satisfy expression (8), which gives the limit of the amount of wavefront aberration.

The optical disk medium employed for explanation in the above-mentioned embodiment can be a ROM medium on which embossed pits are formed in advance or a recordable medium such as a write-once type medium or a rewritable type medium. The track structure may be one in which recording is carried out on a groove or one in which recording is carried out on both a land and a groove.

The invention explained by the present embodiment can also be applied to a multi-layered recording layer having two or more layers. In the case of multiple layers, only the assumed thickness d of the transparent layer changes depending on the layer.

Figure 15:
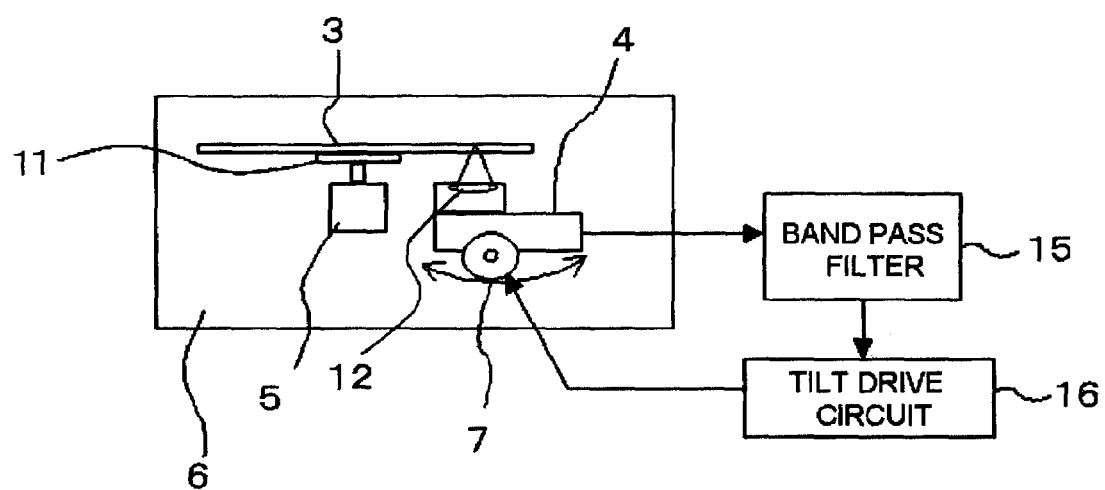
FIG. 15 is a schematic diagram showing the constitution of a drive system according to the embodiment.

FIG. 15 is a schematic view showing the constitution of a drive system 6 for playing back or recording the above-mentioned optical disk medium. An optical disk medium 3 is mounted on a spindle 5 having a turntable 11 and rotated. An objective lens 12 is mounted on an optical head 4, thus forming a very small spot on a recording surface. In FIG. 15, a tilt drive mechanism 7 is controlled using a tilt signal detected by the optical head 4 via a band pass filter 15 and a tilt drive circuit 16, thus controlling the tilt as shown by arrows.

The mechanism for compensating for the tilt can tilt a carriage for making the optical head 4 access in the radial direction or can tilt only the optical head 4 installed on the carriage. It is also possible to tilt the objective lens 12 alone, or to employ optical control involving generating wavefront aberration, etc. for compensating for the tilt by a liquid crystal device installed within an optical system. Furthermore, instead of optical control, a method involving compensating for the tilt characteristics by signal processing, for example controlling characteristics, such as a cross talk canceller that simultaneously detects signals from adjacent tracks and subtracts a cross talk portion from the subject track, can also be considered.

With regard to means for detecting the tilt in order to carry out control, an optical reflective medium tilt sensor may be provided on the optical head 4, or means for searching for an optimum tilt point so as to give the best signal playback characteristics may be employed.

As hereinbefore described, making the tilt of the objective lens 12 track only the slow tilt change during recording or playback of the optical disk medium 3 can realize high density characteristics of the optical disk medium 3 while suppressing any increase in the cost of the optical disk medium 3 and the drive system 3.

In accordance with the present embodiment, the thickness of a transparent substrate or a transparent cover layer provided as a protective layer over the entire surface of an optical disk medium can be set so as not to be susceptible to fingerprints, dust, etc., thereby eliminating factors that cause an increase in the production cost of the optical disk medium.

The present invention can realize an optical disk medium and a drive system that enable high density recording, with a transparent substrate or a transparent cover that has the same level of thickness as that of a conventional substrate or cover and that is not susceptible to fingerprints, dust, etc.

Although the present invention has been described by way of exemplary embodiments, it should be understood that many changes and substitutions may be made by those skilled in the art without departing from the spirit and the scope of the present invention which is defined only by the appended claims.

What is claimed is:

1. An optical disk medium having a disk shape and comprising:
    recorded information tracks formed in a concentric or spiral manner; and
    a transparent substrate or a transparent cover layer through which the recorded information tracks are irradiated by a laser beam to record or play back information;
    when the lens numerical aperture of an objective lens through which the laser beam irradiates the optical disk medium is denoted by NA, the wavelength of the laser beam is denoted by $\lambda$ µm, the refractive index of the transparent substrate or the transparent cover layer is denoted by n, the thickness of the transparent substrate or the transparent cover layer is denoted by d µm, and the minimum pit length of pits formed on the recorded information tracks is denoted by Lp µm, the relationships $d \geq 200/\tan(\sin^{-1}(NA/n))$ and $Lp \leq 0.35 \cdot \lambda/NA$ being satisfied;
    a change in the tilt of the surface of the optical disk medium over one circuit of each of the information tracks being equal to or less than a first predetermined value;
    a change in the tilt over the entire surface of the optical disk medium being equal to or less than a second predetermined value; and
    the second predetermined value being larger than the first predetermined value,
    wherein the first predetermined value is equal to or less than $38 \cdot \lambda/(NA^3 \cdot d) \cdot n^3/(n^2-1)$ deg.

2. An optical disk medium having a disk shape and comprising:
    recorded information tracks formed in a concentric or spiral manner; and
    a transparent substrate or a transparent cover layer through which the recorded information tracks are irradiated by a laser beam to record or play back information;
    when the lens numerical aperture of an objective lens through which the laser beam irradiates the optical disk medium is denoted by NA, the wavelength of the laser beam is denoted by $\lambda$ µm, the refractive index of the transparent substrate or the transparent cover layer is denoted by n, the thickness of the transparent substrate or the transparent cover layer is denoted by d µm, and the minimum pit length of pits formed on the recorded information tracks is denoted by Lp µm, the relationships $d \geq 200/\tan(\sin^{-1}(NA/n))$ and $Lp \leq 0.35 \cdot \lambda/NA$ being satisfied;
    a change in the tilt of the surface of the optical disk medium over one circuit of each of the information tracks being equal to or less than a first predetermined value; and
    a change in the tilt over the entire surface of the optical disk medium being equal to or more than the first predetermined value,
    wherein the first predetermined value is equal to or less than $38 \cdot \lambda/(NA^3 \cdot d) \cdot n^3/(n^2-1)$ deg.

3. An optical disk medium having a disk shape and comprising:
    recorded information tracks formed in a concentric or spiral manner; and
    a transparent substrate or a transparent cover layer through which the recorded information tracks are irradiated by a laser beam to record or play back information;
    when the lens numerical aperture of an objective lens through which the laser beam irradiates the optical disk medium is denoted by NA, the wavelength of the laser beam is denoted by $\lambda$ µm, the refractive index of the transparent substrate or the transparent cover layer is denoted by n, the thickness of the transparent substrate or the transparent cover layer is denoted by d µm, and the minimum pit length of pits formed on the recorded information tracks is denoted by Lp µm, the relationships $d \geq 200/\tan(\sin^{-1}(NA/n))$ and $Lp \leq 0.35 \cdot \lambda/NA$ being satisfied;
    a change in the tilt in a direction orthogonal to the track of the surface of the optical disk medium over one circuit of each of the information tracks being equal to or less than a first predetermined value;
    a change in the tilt in the track direction over the entire surface of the optical disk medium being equal to or less than a second predetermined value;

a change in the tilt in the direction orthogonal to the track over the entire surface of the optical disk medium being equal to or less than a third predetermined value;

the third predetermined value being larger than the first predetermined value; and the third predetermined value being larger than the second predetermined value, wherein the first predetermined value is equal to or less than $38 \cdot \lambda/(NA^3 \cdot d) \cdot n^3/(n^2-1)$ deg.

4. An optical disk medium having a disk shape and comprising:

recorded information tracks formed in a concentric or spiral manner; and a transparent substrate or a transparent cover layer through which the recorded information tracks are irradiated by a laser beam to record or play back information;

when the lens numerical aperture of an objective lens through which the laser beam irradiates the optical disk medium is denoted by NA, the wavelength of the laser beam is denoted by $\lambda$ μm, the refractive index of the transparent substrate or the transparent cover layer is denoted by n, the thickness of the transparent substrate or the transparent cover layer is denoted by d μm, and the minimum pit length of pits formed on the recorded information tracks is denoted by Lp μm, the relationships $d \geq 200/\tan(\sin^{-1}(NA/n))$ and $Lp \leq 0.35 \cdot \lambda/NA$ being satisfied;

a change in the tilt in a direction orthogonal to the track of the surface of the optical disk medium over one circuit of each of the information tracks being equal to or less than a first predetermined value;

a change in the tilt in the direction orthogonal to the track over the entire surface of the optical disk medium being equal to or more than the first predetermined value; and a change in the tilt in the track direction over the entire surface of the optical disk medium being equal to or less than a second predetermined value, wherein the first predetermined value is equal to or less than $38 \cdot \lambda/(NA^3 \cdot d) \cdot n^3/(n^2-1)$ deg.

5. An optical disk medium having a disk shape and comprising:

recorded information tracks formed in a concentric or spiral manner;

a transparent substrate or a transparent cover layer through which the recorded information tracks are irradiated by a laser beam to record or play back information;

a change in the tilt of the surface of the optical disk medium over one circuit of each of the information tracks being equal to or less than a first predetermined value; and a change in the tilt over the entire surface of the optical disk medium being equal to or less than a second predetermined value;

when the lens numerical aperture of an objective lens through which the laser beam irradiates the optical disk medium is denoted by NA, the wavelength of the laser beam is denoted by $\lambda$ μm, the thickness of the transparent substrate or the transparent cover layer is denoted by d μm, the refractive index thereof is denoted by n, the minimum pit length of pits formed on the information tracks is denoted by Lp μm, the first predetermined value is $\theta a$ deg, and the second predetermined value is $\theta b$ deg, the relationships $Lp \leq 0.35 \cdot \lambda/NA$ $\theta a \leq 38 \cdot \lambda/(NA^3 \cdot d) \cdot n^3/(n^2-1)$, $d \geq 200/\tan(\sin^{-1}(NA/n))$, and $\theta a < \theta b$ being satisfied.

6. An optical disk medium having a disk shape and comprising:

recorded information tracks formed in a concentric or spiral manner;

a transparent substrate or a transparent cover layer through which the recorded information tracks are irradiated by a laser beam to record or play back information; and a change in the tilt of the surface of the optical disk medium over one circuit of each of the information tracks being equal to or less than a first predetermined value;

when the wavelength of the laser beam for recording/playback is denoted by $\lambda$ μm, the lens numerical aperture of an objective lens through which the laser beam irradiates the optical disk medium is denoted by NA, the thickness of the transparent substrate or the transparent cover layer is denoted by d μm, the refractive index thereof is denoted by n, the minimum pit length of pits formed on the information tracks is denoted by Lp μm, and the first predetermined value is $\theta a$ deg, the relationships $Lp \leq 0.35 \cdot \lambda/NA$, $\theta a \leq 38 \cdot \lambda/(NA^3 \cdot d) \cdot n^3/(n^2-1)$, and $d \geq 200/\tan(\sin^{-1}(NA/n))$ being satisfied.

7. An optical disk medium having a disk shape and comprising:

recorded information tracks formed in a concentric or spiral manner;

a transparent substrate or a transparent cover layer through which the recorded information tracks are irradiated by a laser beam to record or play back information;

a change in the tilt in a direction orthogonal to the track of the surface of the optical disk medium over one circuit of each of the information tracks being equal to or less than a first predetermined value;

a change in the tilt in the track direction over the entire surface of the optical disk medium being equal to or less than a second predetermined value; and a change in the tilt in the direction orthogonal to the track over the entire surface of the optical disk medium being equal to or less than a third predetermined value;

when the wavelength of the laser beam for recording/playback is denoted by $\lambda$ μm, the lens numerical aperture of an objective lens through which the laser beam irradiates the optical disk medium is denoted by NA, the thickness of the transparent substrate or the transparent cover layer is denoted by d μm, the refractive index thereof is denoted by n, the minimum pit length of pits formed on the information tracks is denoted by Lp μm, the first predetermined value is $\theta a$ deg, the second predetermined value is θb deg, and the third predetermined value is θc deg, the relationships $Lp \leq 0.35 \cdot \lambda/NA$, $\theta a \leq 38 \cdot \lambda/(NA^3 \cdot d) \cdot n^3/(n^2-1)$, $\theta b \leq 38 \cdot \lambda/(NA^3 \cdot d) \cdot n^3/(n^2-1)$, $\theta c \leq 38 \cdot \lambda/(NA^3 \cdot d) \cdot n^3/(n^2-1)$, $\theta a \leq \theta c, \theta b \leq \theta c$, and $d \geq 200/\tan(\sin^{-1}(NA/n))$ being satisfied.

8. An optical disk medium having a disk shape and comprising:
  recorded information tracks formed in a concentric or spiral manner;
  a transparent substrate or a transparent cover layer through which the recorded information tracks are irradiated by a laser beam to record or play back information;
  a change in the tilt in a direction orthogonal to the track of the surface of the optical disk medium over one circuit of each of the information tracks being equal to or less than a first predetermined value; and
  a change in the tilt in the direction orthogonal to the track over the entire surface of the optical disk medium being equal to or less than a third predetermined value;
  when the wavelength of the laser beam for recording and play back is denoted by λ μm, the lens numerical aperture of an objective lens through which the laser beam irradiates the optical disk medium is denoted by NA, the thickness of the transparent substrate or the transparent cover layer is denoted by d μm, the refractive index thereof is denoted by n, the minimum pit length of pits formed on the information tracks is denoted by Lp μm, the first predetermined value is θa deg, and the third predetermined value is θc deg, the relationships $Lp \leq 0.35 \cdot \lambda/NA$, $\theta a \leq 38 \cdot \lambda/(NA^3 \cdot d) \cdot n^3/(n^2-1)$, $\theta c \leq 38 \cdot \lambda/(NA^3 \cdot d) \cdot n^3/(n^2-1)$, and $d \geq 200/\tan(\sin^{-1}(NA/n))$ being satisfied.

9. The optical disk medium according to claim 1 wherein the wavelength of the laser beam for recording/playback is at least 0.40 μm and at most 0.42 μm, and the lens numerical aperture is at least 0.6.

10. The optical disk medium according to claim 2 wherein the wavelength of the laser beam for recording/playback is at least 0.40 μm and at most 0.42 μm, and the lens numerical aperture is at least 0.6.

11. The optical disk medium according to claim 3 wherein the wavelength of the laser beam for recording/playback is at least 0.40 μm and at most 0.42 μm, and the lens numerical aperture is at least 0.6.

12. The optical disk medium according to claim 4 wherein the wavelength of the laser beam for recording/playback is at least 0.40 μm and at most 0.42 μm, and the lens numerical aperture is at least 0.6.

13. The optical disk medium according to claim 5 wherein the wavelength of the laser beam for recording/playback is at least 0.40 μm and at most 0.42 μm, and the lens numerical aperture is at least 0.6.

14. The optical disk medium according to claim 6 wherein the wavelength of the laser beam for recording/playback is at least 0.40 μm and at most 0.42 μm, and the lens numerical aperture is at least 0.6.

15. The optical disk medium according to claims 7 wherein the wavelength of the laser beam for recording/playback is at least 0.40 μm and at most 0.42 μm, and the lens numerical aperture is at least 0.6.

16. The optical disk medium according to claims 8 wherein the wavelength of the laser beam for recording/playback is at least 0.40 μm and at most 0.42 μm, and the lens numerical aperture is at least 0.6.

17. The optical disk medium according to claim 1 wherein the first predetermined value is at least 0.1 deg and less than 0.25 deg.

18. The optical disk medium according to claim 2 wherein the first predetermined value is at least 0.1 deg and less than 0.25 deg.

19. The optical disk medium according to claim 3 wherein the first predetermined value is at least 0.1 deg and less than 0.25 deg.

20. The optical disk medium according to claim 4 wherein the first predetermined value is at least 0.1 deg and less than 0.25 deg.

21. The optical disk medium according to claim 5 wherein the first predetermined value is at least 0.1 deg and less than 0.25 deg.

22. The optical disk medium according to claim 6 wherein the first predetermined value is at least 0.1 deg and less than 0.25 deg.

23. The optical disk medium according to claim 7 wherein the first predetermined value is at least 0.1 deg and less than 0.25 deg.

24. The optical disk medium according to claim 8 wherein the first predetermined value is at least 0.1 deg and less than 0.25 deg.

25. The optical disk medium according to claim 1 wherein the second predetermined value is at least 0.1 deg and less than 0.25 deg.

26. The optical disk medium according to claim 3 wherein the second predetermined value is at least 0.1 deg and less than 0.25 deg.

27. The optical disk medium according to claim 4 wherein the second predetermined value is at least 0.1 deg and less than 0.25 deg.

28. The optical disk medium according to claim 5 wherein the second predetermined value is at least 0.1 deg and less than 0.25 deg.

* * * * *